Patented July 1, 1947

2,423,093

UNITED STATES PATENT OFFICE 2,423,093

ETHYLENE GLYCOL-ISOPROPYLENE GLYCOL-SEBACIC ACID-ACONITIC ACID POLYESTER

Carl J. Frosch, Chatham, N. J., assignor to Bell Telephone Laboratories, Incorporated, New York, N. Y., a corporation of New York No Drawing. Application October 14, 1943, Serial No. 506,263. In Canada January 8, 1943

2 Claims. (Cl. 260—75)

1

This invention relates to high molecular weight polymers possessing a high degree of linearity. This application is a continuation in part of the copending applications of C. J. Frosch, Serial Nos. 401,957 and 401,958, filed July 11, 1941.

The present invention relates particularly to polyesters having a high degree of linearity, identical with those formed from a reaction mixture made up primarily of bifunctional reactants, the functional groups of which are ester forming functional groups, but containing in addition a small amount of olefinic unsaturation and a small amount of tri- or higher functionality. The present invention also relates to the cross-linking of these polyesters with organic peroxides to form tough, infusible, insoluble polymers and to the polymers thus formed.

The preparation of strictly linear polyesters of high molecular weight has been described by Carothers and Hill, Journal of the American Chemical Society, vol. 54, 1932, pp. 1557 to 1566, and has also been described in U. S. Patents 2,071,250 and 2,249,950. These strictly linear polyesters are formed by the esterification of bifunctional linear polyester forming reactants containing no non-benzenoid unsaturation, such as hydroxy carboxylic acids or mixtures of glycols and dicarboxylic acids. When this esterification is caused to proceed until the linear polyester molecules have achieved a sufficient average length, hard tough materials possessing the property of cold drawing are produced if the substances are microcrystalline. If the substances are essentially non-crystalline at ordinary temperatures they are viscous, amorphous liquids or in some cases amorphous glasses even though they achieve the same average molecular weights.

The polyesters of the present invention may be prepared in a similar manner except that ingredients containing olefinic unsaturation and a functionality greater than 2, are substituted for or added to the bifunctional reactants in the reaction mixture in amounts such as to impart the benefits of the present invention without interfering with the achievement of the desired degree of linear growth. The products have physical properties similar to the corresponding strictly linear polyesters except that they are more viscous in their liquid states and are more resistant to hydrolysis.

When the crystalline polyesters are heated with an organic peroxide, such as benzoyl peroxide, they are cured to an infusible, insoluble state. The resulting cured product, at ordinary temperatures, resembles the uncured product except that it is tougher and more resistant to hydrolysis. When these cured crystalline polyesters are heated above the melting point of their crystallites, the substances become rubber-like in their properties. If an essentially non-crystalline polyester is cured in the same manner, it is ordinarily converted to a substance which at room temperatures is rubber-like and possesses a high reversible elasticity.

The polyesters of the present invention can be conveniently prepared by esterifying a glycol containing no non-benzenoid unsaturation with a mixture of a dicarboxylic acid containing no non-benzenoid unsaturation and aconitic acid

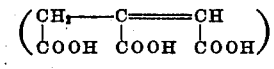

In general the amount of aconitic acid should not exceed about 5 mol per cent of the dicarboxylic acid mixture when it is desired to produce fusible microcrystalline polyesters of a sufficient degree of linear growth to permit cold drawing or when it is desired to produce essentially non-crystalline polyesters of a degree of linear growth corresponding to at least 98 per cent linear esterification.

In some instances, where such a high degree of linear growth is not required, it may be desirable to add considerably more aconitic acid up to about 25 per cent. In general, the benefits of the present invention are obtained when the aconitic acid is present in amounts exceeding about .025 mol per cent of the dicarboxylic acid mixture, but it is usually desirable to have at least .5 mol per cent aconitic acid present. For the best results the aconitic acid should not be present in amounts exceeding 2 or 3 mol per cent.

The polyesters thus produced are crystalline or non-crystalline depending upon the nature of the glycol and dicarboxylic acid employed.

Polyesters derived by the esterification of polymethylene glycols with polymethylene dicarboxylic acids or by the esterification of polymethylene monohydroxy monocarboxylic acids are, with the exception of those produced from trimethylene glycol and glutaric acid, the most highly crystalline polyesters which have been produced. As the molecular structure departs from this straight chain polymethylene arrangement, as for instance by the introduction of side chain substituents, hetero-atoms or unsaturated carbon-to-carbon bonds, the polyesters become less crystalline. The presence of aromatic rings also in general reduces the crystallinity.

Therefore, polyesters prepared by reacting glycols with dicarboxylic acids, where either one of the constituents has frequently occurring or large side chains, or contains large amounts of non-benzenoid unsaturation or aromatic rings or hetero-atoms in the linear chains, are usually non-crystalline. However, if the other member of the reaction mixture is a polymethylene glycol or a polymethylene dicarboxylic acid, the cyrstallizing tendencies of the polyester increase as the length of the polymethylene chain increases. Thus, dihydromuconic acid forms a non-crystalline polyester with ethylene glycol but a crystalline polyester with decamethylene glycol. Diethylene glycol forms a non-crystalline polyester with succinic acid but a crystalline polyester with sebacic acid.

Among the alkyl substituted polymethylene glycols, the most available is isopropylene glycol, or methylethylene glycol. This glycol forms non-crystalline polyesters with polymethylene dicarboxylic acids between succinic acid and sebacic acid. Polyisopropylene succinate does not become highly crystalline when as much as 50 or 60 per cent of the isopropylene glycol is replaced by ethylene glycol. With isopropylene sebacate, however, no more than about 30 per cent of ethylene glycol can be substituted for the isopropylene glycol without inducing a relatively high degree of crystallization.

The most available of the non-crystalline polyester forming reactants containing hetero-atoms are diethylene glycol and di-isopropylene glycol. Diglycolic acid is also of some interest as a hetero-atom containing compound. The most available of the aromatic ring containing reactants is phthalic acid.

Trimethylene glycol and glutaric acid, both of which contain three methylene groups between their functional end groups, form polyesters, with the shorter chain polymethylene glycol and polymethylene dicarboxylic acids, which crystallize exceedingly slowly.

Another factor influencing crystallinity, aside from the molecular structure of the individual constituents, is the degree of order in the polyester molecules. The most ordered molecules having the most regular polar group spacing, all other factors being equivalent, are the most crystalline. Thus, the greater the number of glycols and the greater the number of dicarboxylic acids or the greater the number of hydroxy acids used in preparing the polyester, the less will be the tendency to crystallize. In a polyester prepared from ethylene glycol and equimolar amounts of sebacic and succinic acids, or similar polyesters in which maleic acid is substituted for portions of the succinic acid, the disorder imparts a high degree of non-crystallinity.

Introduction of the unsaturation and polyfunctionality of the present invention will tend to reduce the crystallinity of the polyesters into which they are introduced. However, the amounts of unsaturation and polyfunctionality are so small, where the extremely high molecular weights referred to above are desired, that the effect upon crystallinity is not great.

In order to produce a high degree of esterification it is necessary to subject the reactants from which the polyesters are produced to a prolonged heating operation under conditions such as to remove the reaction by-products continuously and effectively. The reaction by-products are most effectively removed by bubbling an inert gas, such as dry, oxygen-free hydrogen, through the reaction mixture until the esterification or condensation has proceeded to the desired degree of completion, with or without the application of reduced pressure. The reaction by-products may also be removed by other means, such as by the use of a molecular still or by stirring the reaction mixture continuously into a foam under reduced pressure. Unless some such method is employed, the desired high degree of condensation cannot be obtained within a reasonable time or before such cross-linking has taken place as to render the polymer excessively viscous or infusible.

In view of the tendency of esterification mixtures containing unsaturated bonds to become set due to prolonged heating before the desired degree of linear growth is obtained, it is desirable to use an esterification technique which will consistently require a minimum of time. When the polyester is formed from glycols and dicarboxylic acids, this can be accomplished by employing a large excess of glycol in the initial reaction mixture, preferably between about 5 per cent excess and about 50 per cent excess, and carrying out the initial esterification reaction in a vessel equipped with a reflux condenser which is maintained at a temperature sufficient to permit the escape of water vapor while returning the greater part of the vaporized glycol to the reaction mixture. The esterification reaction is conducted at a temperature between about 180° C. and about 220° C. and preferably in the vicinity of about 200° C. The large excess of glycol which is retained in the reaction mixture pushes the esterification reaction rapidly to completion leading to the formation of a relatively low molecular weight polyester, substantially all the molecules of which have hydroxyl groups at both ends.

Further linear growth can then proceed only through an elimination of glycols from the ends of the polyester molecules. This is accomplished by continuing the heating, without reflux, under a reduced pressure of the order of a few millimeters of mercury, while bubbling dry, oxygen-free hydrogen through the polyester. Glycol is rapidly eliminated and the molecular weight soon achieves the desired value. This procedure is more particularly described and claimed in the copending application of J. B. Howard, Serial No. 492,155, filed June 24, 1943.

The polymers of the present invention are made up of molecules containing long linear ester chains cross-linked at the double bonds and by the polyfunctionality to a degree insufficient to produce gelation. The most desirable products are those possessing a degree of esterification of at least about 98 per cent, although obviously the advantages of the present invention over strictly linear polyesters are present to some extent in lower molecular weight polyesters.

The following specific examples will illustrate the manner in which the present invention may be carried out.

*Example 1*

A mixture containing 43.5 mol per cent succinic acid, 1 mol per cent aconitic acid, and 55.5 mol per cent ethylene glycol (25 per cent excess glycol), together with a small amount of zinc chloride as a catalyst, were placed in a closed glass reaction vessel maintained at 200° C. and equipped with a packed reflux column maintained at 110° C. and a slow stream of dry, oxygen-free hydrogen was bubbled continuously through the molten mixture. After about five hours, no more water was evolved, indicating that substantially complete esterification had occurred. The reflux column was then removed and the pressure in the system was reduced to about 6 millimeters of mercury, the temperature being maintained at about 200° C. and the bubbling of hydrogen being continued. Glycol distilled over rapidly and after about fifteen minutes an increase of the viscosity of the product was apparent. At the end of about eight hours the product was removed and found to be an exceedingly viscous, transparent liquid, which crystallized upon cooling to a white, brittle, microcrystalline material, which in the form of thin filaments was capable of being cold drawn. A portion of this product was melted and then allowed to supercool to 90° C., at which temperature 1 per cent by weight of finely divided benzoyl peroxide was incorporated by thorough mixing. The resulting mixture was heated for five minutes at 150° C. A transparent, rubbery gel resulted, which, on cooling to room temperature, quickly crystallized to a hard, flexible, opaque product.

*Example 2*

A mixture containing 44.5 mol per cent isopropylene glycol, 11.1 mol per cent ethylene glycol, 43.1 mol per cent distilled sebacic acid, and 1.3 mol per cent aconitic acid (25 per cent excess glycol) was reacted under the conditions set forth in Example 1. The product of the initial esterification reaction was an exceedingly viscous, transparent liquid which crystallized slowly at room temperatures to a tough, flexible, rubbery, translucent solid. A portion of this solid substance was quickly reduced to its viscous, liquid state by milling on cold rolls. About 1 per cent by weight of finely divided benzoyl peroxide was then thoroughly milled into the gum. 75 per cent by weight of "Kalvan" (finely divided precipitated calcium carbonate) was then added to the gum on the rolls and the milling was continued until the pigment was well dispersed. This mixture was then cured under pressure for ten minutes in a mold heated to 125° C. The product possessed rubber-like properties at room temperatures and had relatively high tensile strength and reversible elasticity.

Although the invention has been described in terms of its specific embodiments, certain modifications and equivalents will be apparent to those skilled in the art and are intended to be included within the scope of the invention, which is to be limited only by the reasonable scope of the appended claims.

What is claimed is:

1. An ethylene glycol-isopropylene glycol-sebacic acid-aconitic acid polyester, the aconitic acid entering into said polyester constituting between about .025 mol per cent and about 5 mol per cent of the total sebacic acid and aconitic acid, said polyester being non-cyclic and possessing a degree of linear growth corresponding to a degree of esterification in excess of 98 per cent.

2. An infusible, insoluble polymer produced by curing, with benzoyl peroxide, an ethylene glycol-isopropylene glycol-sebacic acid-aconitic acid polyester, the aconitic acid entering into said polyester constituting between about .025 mol per cent and about 5 mol per cent of the total sebacic acid and aconitic acid, said polyester being non-cyclic and possessing a degree of linear growth corresponding to a degree of esterification in excess of 98 per cent.

CARL J. FROSCH.

REFERENCES CITED

The following references are of record in the file of this patent:

UNITED STATES PATENTS

| Number | Name | Date |
| --- | --- | --- |
| 2,319,799 | D'Alelio | May 25, 1943 |
| 2,282,827 | Rothrock | May 12, 1942 |
| 2,333,639 | Christ et al. | Nov. 9, 1943 |
| 2,322,756 | Wallder | June 29, 1943 |
| 2,255,313 | Ellis | Sept. 9, 1941 |
| 2,071,250 | Carothers | Feb. 16, 1937 |

FOREIGN PATENTS

| Number | Country | Date |
| --- | --- | --- |
| 500,547 | Great Britain | Feb. 3, 1939 |

OTHER REFERENCES

Vincent, Ind. Eng. Chem., Nov. 1937, pages 1267-9.